United States Patent [19]

Wyatt et al.

[11] Patent Number: 4,500,650

[45] Date of Patent: Feb. 19, 1985

[54] THREE-WAY CATALYSTS FOR PURIFICATION OF EXHAUST GAS AND METHOD FOR THE PREPARATION OF THE CATALYSTS

[75] Inventors: Michael Wyatt, Wallingford; Gary M. Leach; Ashley M. Gould, both of Reading, all of England

[73] Assignee: Johnson Matthey Public Limited Company, London, England

[21] Appl. No.: 340,046

[22] Filed: Jan. 18, 1982

[30] Foreign Application Priority Data

Jan. 20, 1981 [GB] United Kingdom ............... 8101603

[51] Int. Cl.$^3$ ............................................. B01J 23/64
[52] U.S. Cl. ................................... 502/204; 502/254; 502/302; 502/306; 502/308; 502/309; 502/313; 502/315; 423/213.2
[58] Field of Search ............... 252/458, 462, 465, 470; 423/213.5; 502/204, 302, 313, 254, 306, 308, 309, 315

[56] References Cited

U.S. PATENT DOCUMENTS

| 3,784,675 | 1/1974 | Kobylinski et al. | 423/213.7 |
|---|---|---|---|
| 3,928,238 | 12/1975 | Koberstein et al. | 252/465 |
| 3,945,946 | 3/1976 | Hindin et al. | 252/465 |
| 3,963,827 | 6/1976 | Catalysis | 423/239 |
| 4,189,404 | 2/1980 | Keith et al. | 252/462 |

FOREIGN PATENT DOCUMENTS

| 2449475 | 9/1980 | France . |
|---|---|---|
| 1558167 | 12/1979 | United Kingdom . |
| 1558004 | 12/1979 | United Kingdom . |

OTHER PUBLICATIONS

Chemical Abstracts, vol. 92 of 1980, p. 291, Abs. No. 16841r.

Primary Examiner—W. J. Shine
Attorney, Agent, or Firm—Cushman, Darby & Cushman

[57] ABSTRACT

This invention relates to a three-way catalyst for use in the purification of exhaust gas from an internal combustion engine, a method of making the same and an exhaust system including a three-way catalyst for an internal combustion engine. Specifically, the three-way catalyst comprises a substrate suitable for the purification of exhaust gas from an internal combustion engine wherein the catalyst comprises a substrate, a refractory oxide layer, tungsten and/or one or more tungsten containing compounds and one or more platinum group metals.

10 Claims, 17 Drawing Figures

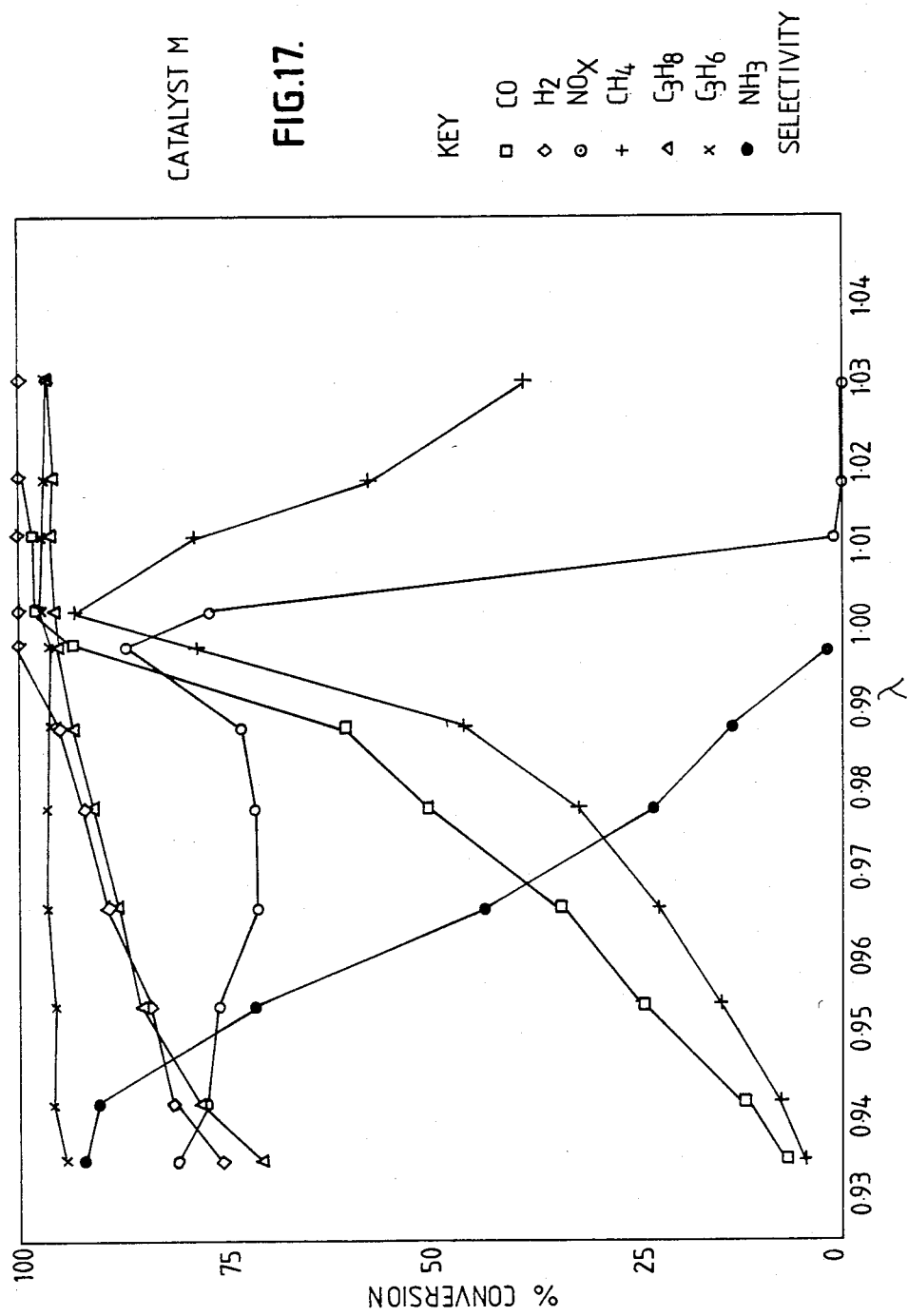

able catalyst which is less likely to convert nitrogen oxides to ammonia and which therefore can be used over a wider range of operating conditions.
THREE-WAY CATALYSTS FOR PURIFICATION OF EXHAUST GAS AND METHOD FOR THE PREPARATION OF THE CATALYSTS This invention relates to a so-called three-way catalyst suitable for the purification of exhaust gas from an internal combustion engine. The invention also relates to a method for such purification of exhaust gas and to an exhaust system for an internal combustion engine (especially the engine of a motor vehicle) which system comprises a three-way catalyst.

Such so-called "three-way" catalysts oxidise carbon monoxide and hydrocarbons and reduce nitrogen oxides. Three-way catalysts only operate effectively on the exhaust gas from an internal combustion engine when the ratio of air to fuel in the mixture of air and fuel supplied to the engine is stoichiometric or nearly so. If the air/fuel ratio is high (that is if the conditions are "lean" of fuel) then removal of nitrogen oxides by reduction cannot occur. On the other hand, if the air/fuel ratio is low (that is if conditions are "rich" in fuel) the nitrogen oxides present in the exhaust gas may be reduced to undesirable ammonia. In order to meet the need for a substantially stoichiometric composition, the composition of the mixture of air and fuel supplied to an internal combustion engine is controlled by a carburetor or a fuel injection system responsive to signals relayed from an oxygen sensor placed in the stream of exhaust gas.

An object of this invention is to provide a three-way catalyst which is less likely to convert nitrogen oxides to ammonia and which therefore can be used over a wider range of operating conditions.

A further object of this invention is to provide a three-way catalyst with improved oxidation of hydrocarbons and which therefore can be used over a wider range of operating conditions.

Accordingly the present invention provides a three-way catalyst suitable for the purification of exhaust gas from an internal combustion engine wherein the catalyst comprises a substrate, a refractory oxide layer, tungsten and/or one or more tungsten-containing compounds and one or more platinum group metals.

The substrate is preferably a monolithic structure through which the exhaust gases may flow. Preferably it is fabricated from a ceramic or metallic material. Suitable ceramic materials include zircon mullite, mullite, magnesium silicate, kaolin clays, zircon, petallite, spondumene, cordierite and most alumina-silicates. Oxidation-resistant metals or alloys may be used as the metallic material. The substrate is provided with a layer of refractory oxide sometimes also called a washcoat. Suitable compounds for the refractory oxide layer (or washcoat) are oxides of B, Al, Ba, Sr, Ca, Mg, Be, Si, Ti, Ni, Zr, Sc, Y and the lanthanides. Preferably the washcoat is alumina or a mixture of alumina and an oxide of one or more of the following metals, Ba, Ce or Ni. The loading of the washcoat is between 0.03 and 0.6 g per cm$^3$ of substrate and is preferably between 0.1 and 0.125 g per cm$^3$ of substrate.

The loading of the platinum group metal or metals is between 300 and 3500 g per m$^3$ of washcoated monolith and the preferred loading is between 600 and 1800 g per m$^3$. The preferred platinum group metals are platinum, rhodium and palladium. The tungsten is preferably present as compounds of tungsten containing oxygen and at a loading of between 700 and 21,000 g per m$^3$. The preferred loadings of tungsten are between 3500 and 14,000 g per m$^3$ and we particularly prefer between 5000 and 11,000 g per m$^3$.

The tungsten or tungsten containing compounds may be mixed with the refractory oxide material before it is deposited on the substrate. Alternatively, the tungsten or tungsten containing compounds may be deposited onto the washcoat from a solution containing tungsten containing compounds and then drying and firing before impregnating with one or more platinum group metals. A composite solution containing both a tungsten containing compound and one or more platinum group metals may also be used so that only two drying and firing stages are required, one stage for the washcoat and one stage after the impregnation of the catalytic metals.

Accordingly this invention also provides a metal for the preparation of three-way catalysts of this invention which comprises:

(a) depositing a refractory oxide layer on a substrate
(b) depositing on the refractory oxide layer a catalyst component which comprises one or more platinum group metals and
(c) before or after deposition, associating a tungsten-containing compound with the refractory oxide and/or the platinum group metal.

The invention also provides a method suitable for the purification of exhaust gas from an internal combustion engine comprising contacting the exhaust gas with a three-way catalyst composed of a substrate, a refractory oxide layer, tungsten or tungsten-containing compound and one or more platinum group metals. The presence of a tungsten or tungsten-containing compounds results in improved hydrocarbon oxidation and/or reduced ammonia formation.

Accordingly this invention also provides an exhaust system suitable for use on a motor vehicle powered by an internal combustion engine wherein the exhaust system comprises:

(a) a three-way catalyst for the purification of exhaust gas
(b) conveying means for conveying exhaust gas from the engine through the catalyst and out to the atmosphere
(c) means for regulating the oxygen content of the exhaust gas which regulating means are responsive to an oxygen sensor located in the conveying means wherein the catalyst comprises a tungsten or tungsten-containing compound and one or more platinum group metals.

BRIEF DESCRIPTION OF THE DRAWINGS

Methods which have been used for carrying out the invention are described in the following by way of example only. These examples also refer to the drawings (FIGS. 1–17) which graphically show the effect on ammonia concentration in exhaust gas or ammonia selectivity for various catalyst combinations based on various amounts and ratios of platinum group metals and tungsten or tungsten compound.

EXAMPLE 1

A number of catalysts were prepared and tested, using a synthetic car exhaust gas, to study the effect of including tungsten or tungsten containing compounds in three-way catalysts. The composition of the catalysts prepared are given in Table 1 below:

TABLE 1

| Catalyst | Loading of metal g per m³ | | | | Pt/Rh ratio |
|---|---|---|---|---|---|
| | Pt | Rh | total PGM | W | |
| 1 | 1010 | 71 | 1081 | 0 | 15:1 |
| 2 | 1090 | 81 | 1171 | 3880 | 13.4:1 |
| 3 | 953 | 80 | 1033 | 3320 | 12:1 |
| 4 | 1080 | 81 | 1161 | 2650 | 31:1 |
| 5 | 953 | 92 | 1045 | 2010 | 10.4:1 |

The total platinum group metal (PGM) loading is the sum of the platinum and rhodium loadings.

The washcoat was alumina containing ceria at a loading of approximately 0.1 g cm$^{-3}$ on a 46 cell cm$^{-2}$ cordierite monolith of length 7.6 cm and diameter 5 cm. After applying the washcoat, the washcoated substrate was dried and fired at 550° C. Following this, the substrate was impregnated with a solution of the platinum group metal and again fired to form catalyst No. 1. Catalyst No. 2 was prepared by mixing tungsten oxide, $WO_3$, with the washcoat before application of the washcoat to the substrate following which the platinum group metal was applied as in the preparation of catalyst No. 1. For catalysts Nos. 3, 4, and 5, the tungsten compounds were deposited from a solution containing the compounds, and the catalyst dried and fired before impregnation with the platinum group metals. The tungsten compounds used were phosphotungstic acid for catalyst No. 3, silicotungstic acid for catalyst No. 4 and sodium tungstate for catalyst No. 5.

As previously indicated, the catalysts were tested on a rig producing synthetic car exhaust gas. The composition of the gas was monitored before and after contact with the catalyst. The initial composition of the gas was CO up to 2%, $CO_2$ 14%, $H_2$ up to 0.7%, $NO_x$ 1,500 ppm, $CH_4$ up to 0.25%, $O_2$ 0.5–1.20%, $SO_2$ 20 ppm, $H_2O$ 10% and $N_2$ balance. The temperature of the gas was 550° C. and the space velocity of the gas through the catalyst was 50,000 hr$^{-1}$. Results are illustrated in FIGS. 1 to 5 of the accompanying drawings.

Figure 1:
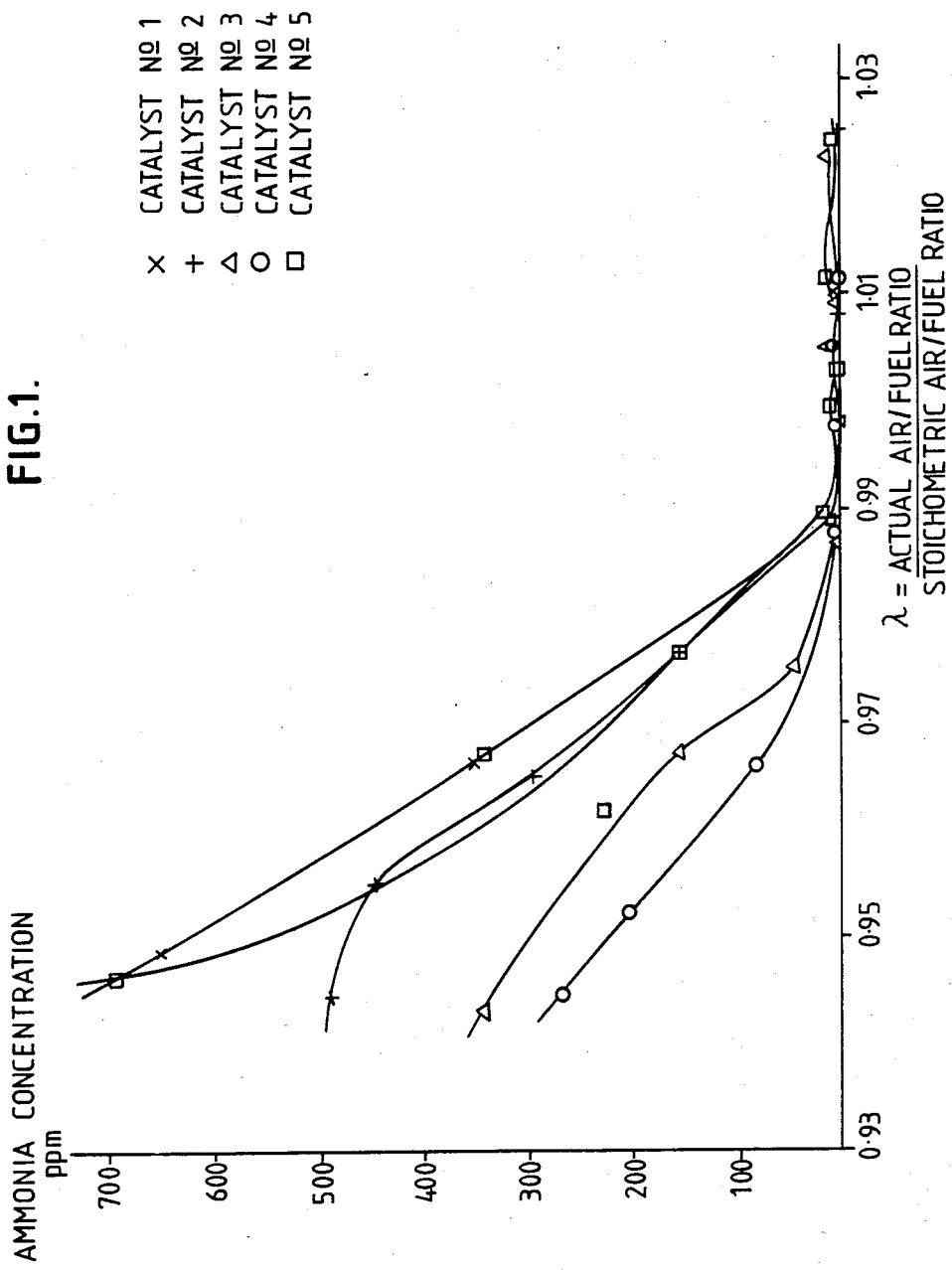
Figure 2:
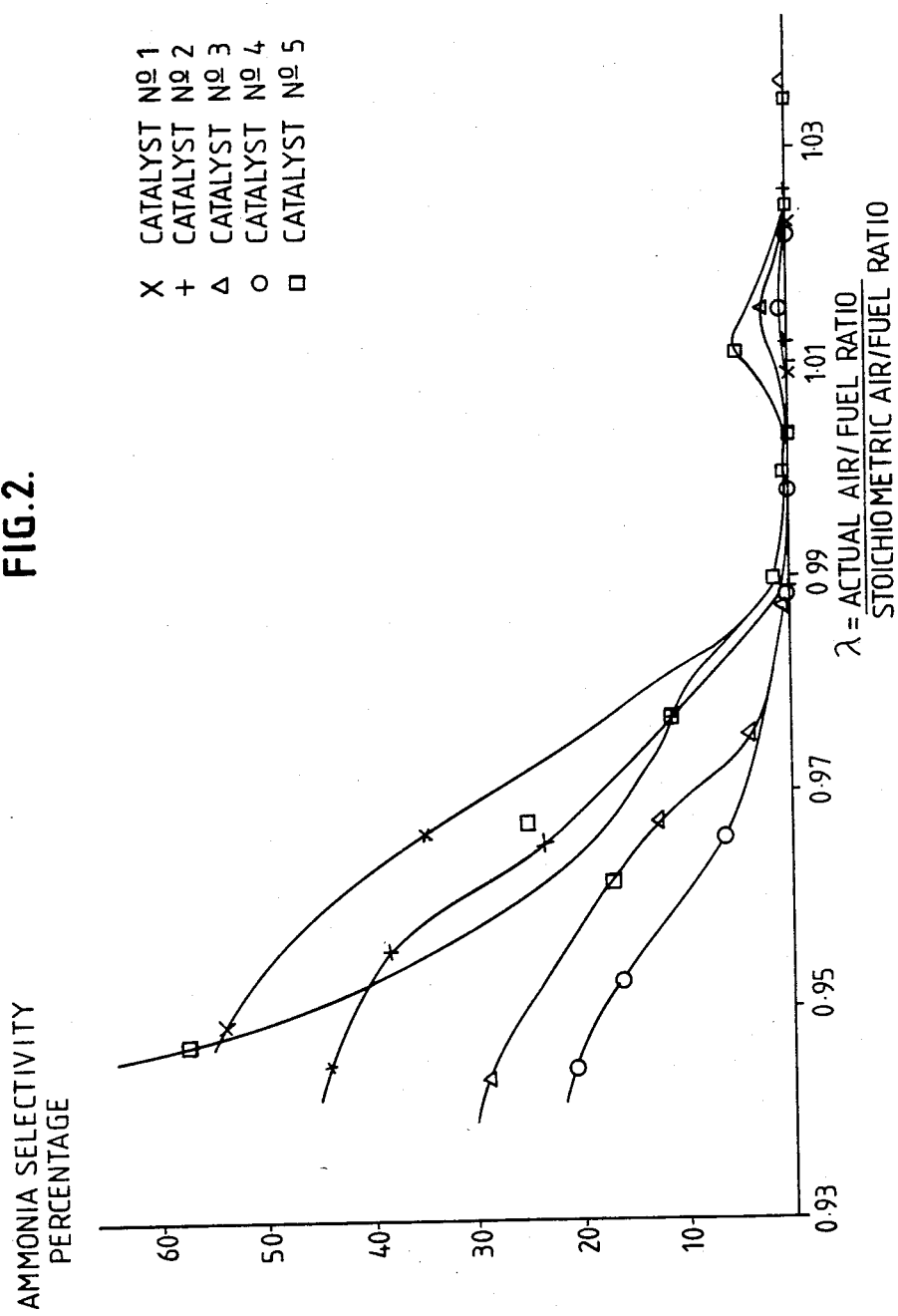

It was found that the concentration of ammonia present in the exhaust gas is reduced when tungsten or tungsten containing compounds are present in a three-way catalyst as shown in FIG. 1. FIG. 2 shows the improvement in ammonia selectivity which is defined as $$\frac{\text{amount of } NO_x \text{ which has reacted to form ammonia}}{\text{total amount of } NO_x \text{ which has reacted}} \times 100$$

EXAMPLE 2

Figure 3:
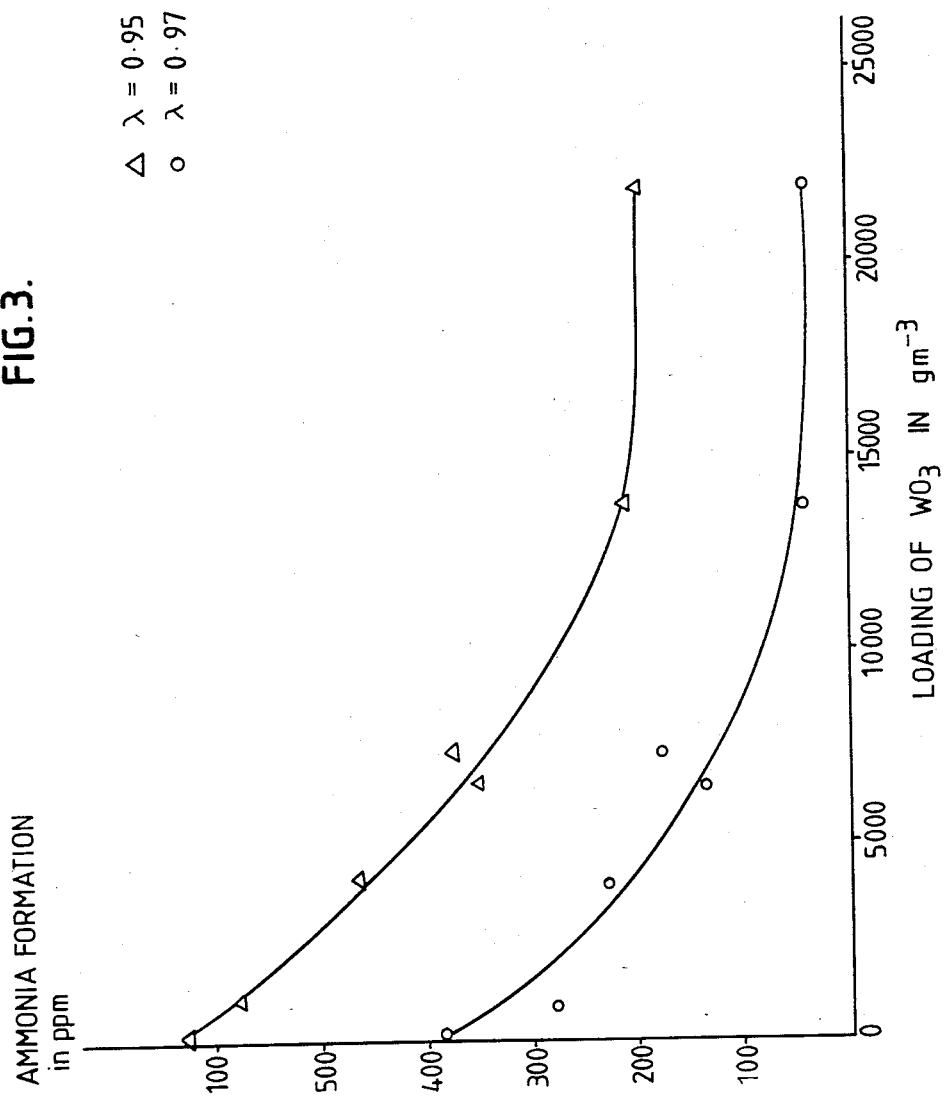
Figure 4:
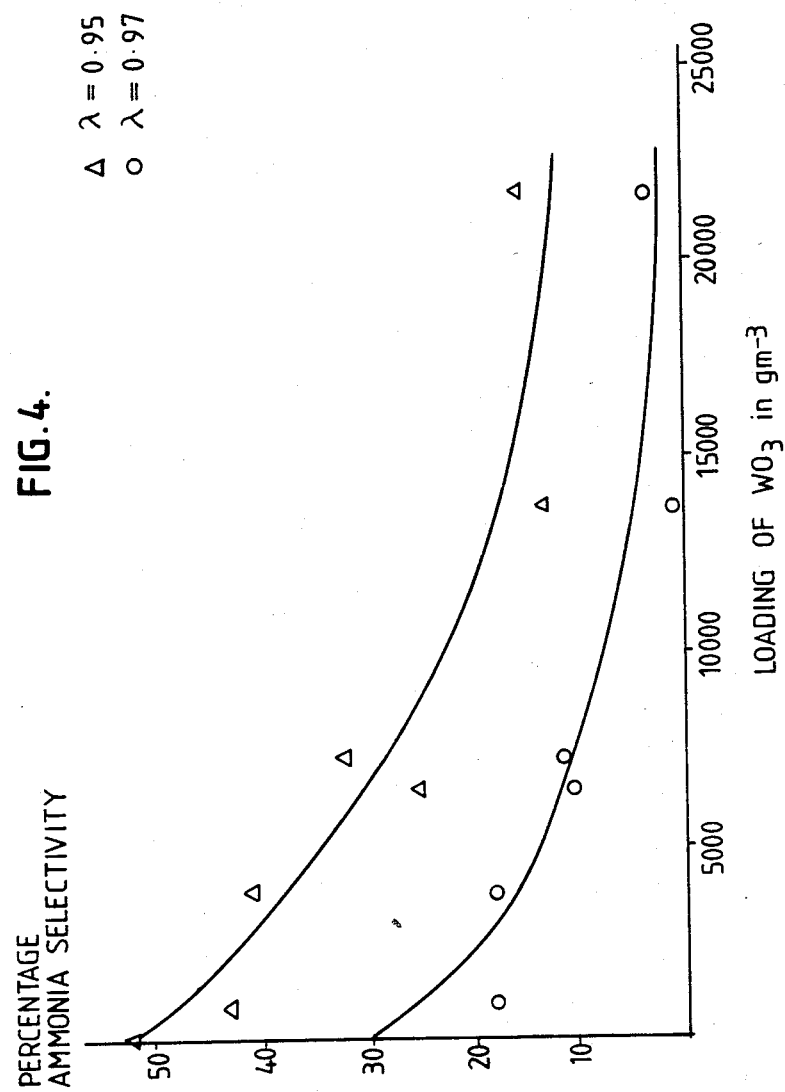
Figure 5:
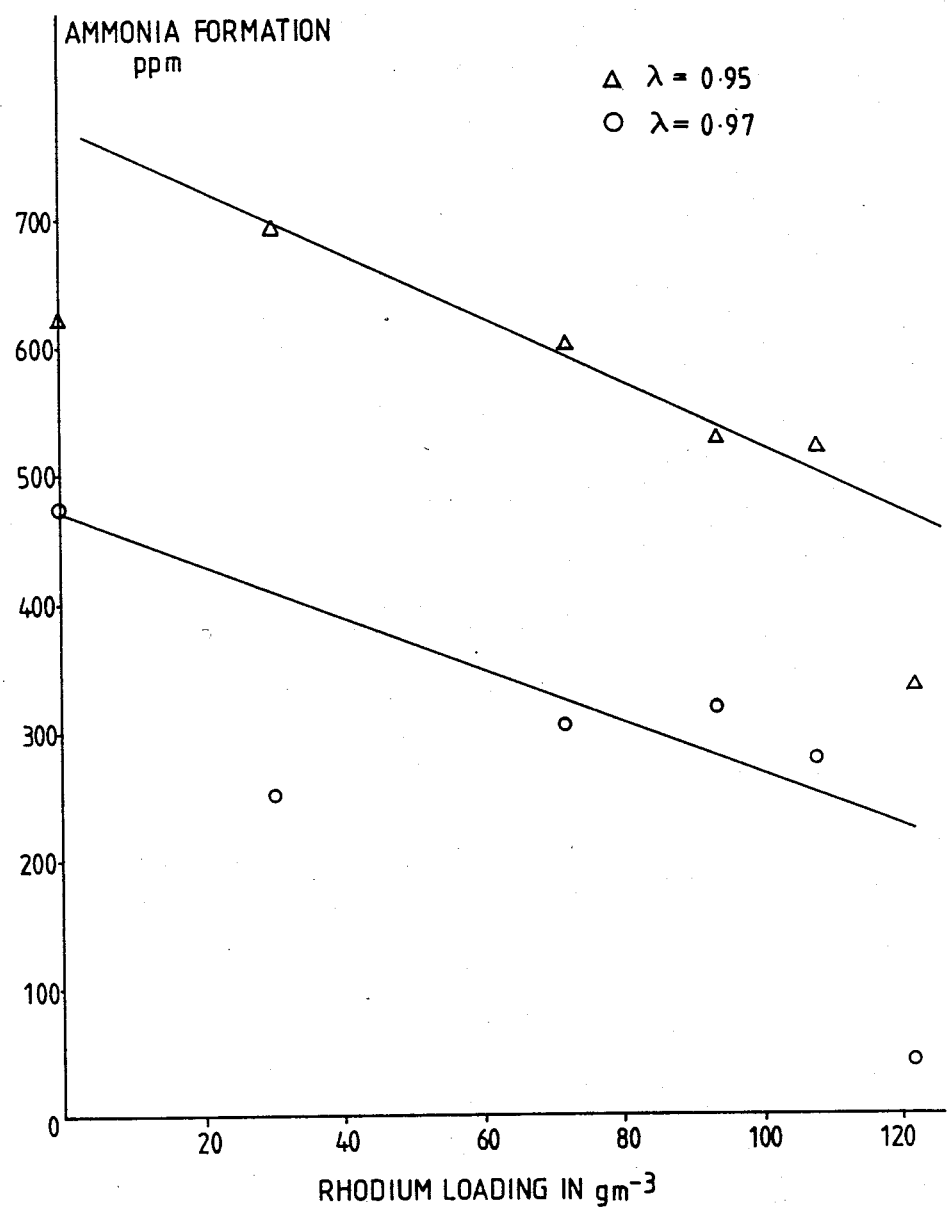

A further set of catalysts were prepared by the method used for the preparation of catalyst No. 2 but with a $WO_3$ loading of between 0 and 22000 g m$^{-3}$. The effect of increasing the tungsten oxide loading is shown in FIGS. 3 and 4.

The loading of rhodium on the catalyst will also effect the formation of ammonia but the effect of the different rhodium loadings on catalysts 1–5 is minimal compared with the effect due to the presence of tungsten. From FIG. 5 the ammonia formation is depressed by 60 ppm and 40 ppm over the range of rhodium loadings used in catalysts 1–5 at λ values of 0.97 and 0.96. By "λ" is meant the following ratio:

$$\frac{\text{actual air/fuel ratio}}{\text{stoichometric air/fuel ratio}}$$

so that when λ=1 the air/fuel ratio is stoichiometric.

A further set of catalysts was prepared and these were tested on a rig producing synthetic car exhaust gas as described above. The initial composition of the gas produced by the rig was the same except for the methane concentration. The concentration of the methane was reduced and propane and propene were added to the gas such that the total amount of oxygen consumed by the hydrocarbons present was the same as that consumed by the methane concentration used previously.

The catalysts in the following examples were prepared as described above with reference to catalyst 2. The washcoat, of alumina, was mixed with tungsten oxide, $WO_3$, before the application of the washcoat to the substrate. A cordierite monolith of cell density 46 cell cm$^{-2}$, length 7.6 cm and diameter 5 cm was used as the catalyst support. The loading of the washcoat was approximately 0.1 g cm$^{-3}$. The tungsten, when present, was at a loading of 8830 g per m³, approximately.

EXAMPLE 3

Figure 6:
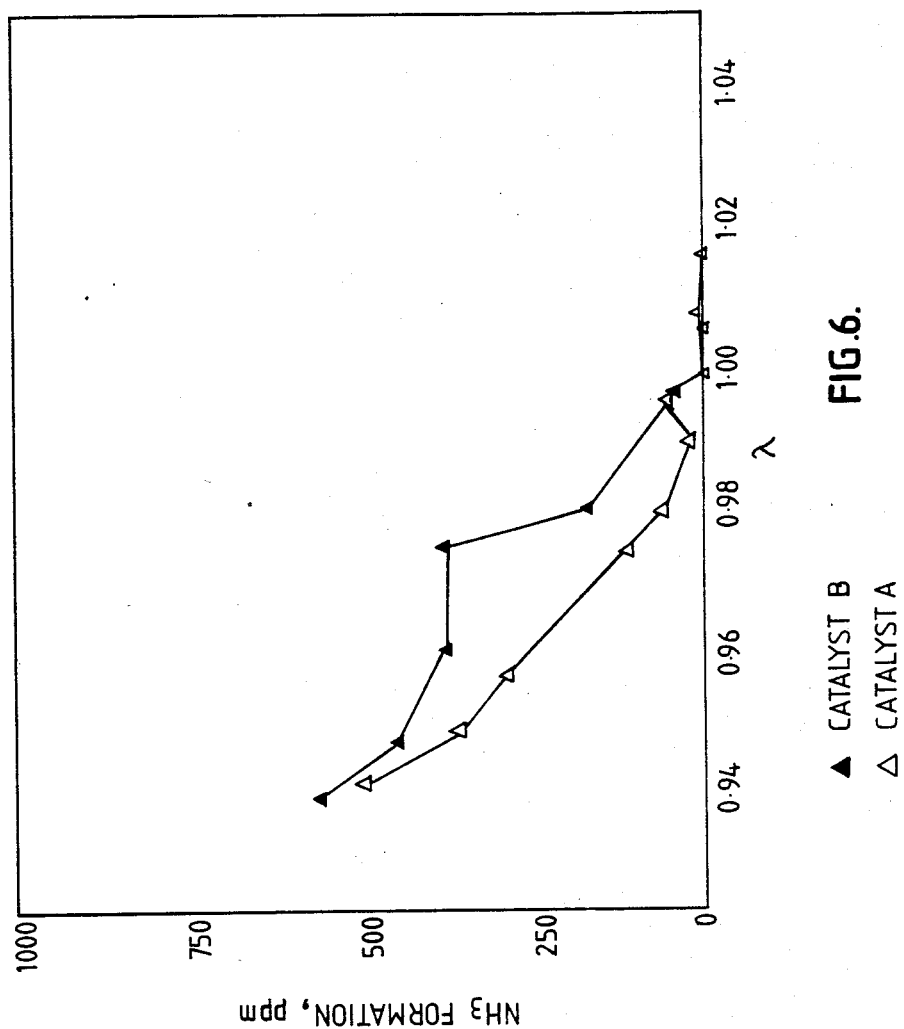
Figure 7:
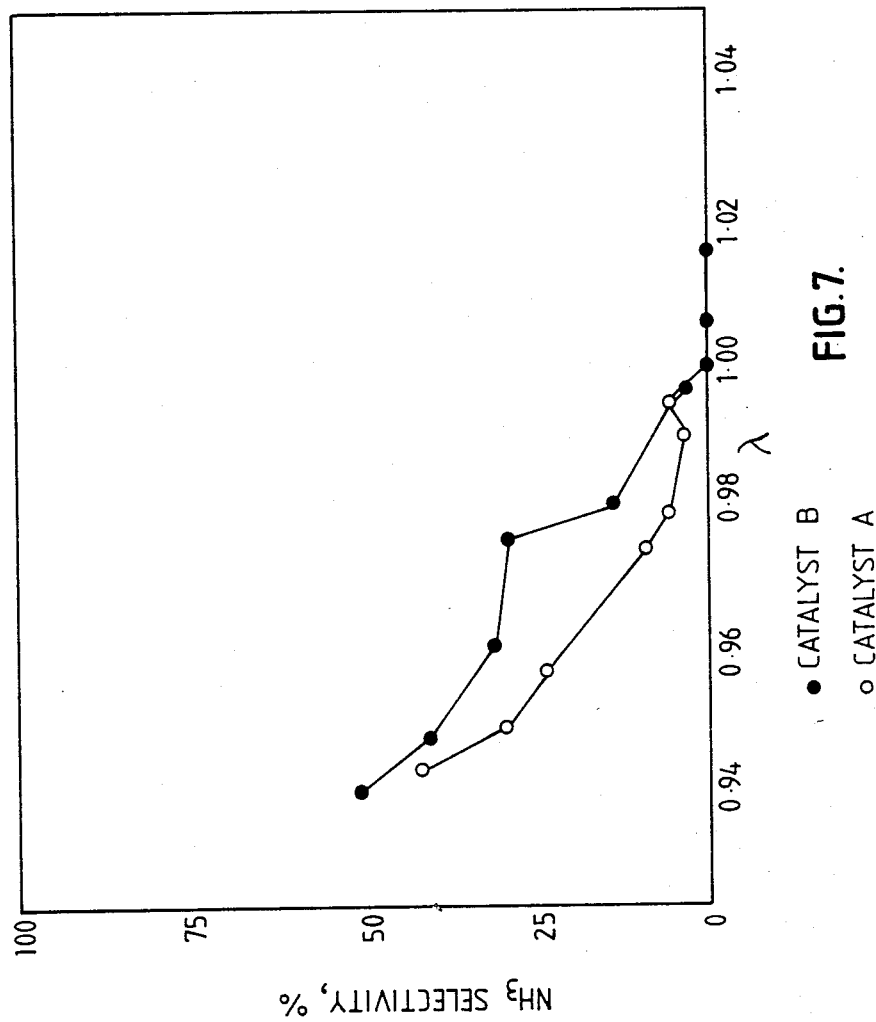

Two catalysts, A and B, were prepared containing palladium as the platinum group metal. Catalyst A also contained tungsten. The loading of the palladium was at 883 g per m³. The amount of ammonia present in the gas downstream of the catalyst was measured. FIG. 6 shows ammonia formation against λ for catalysts A and B and FIG. 7 shows ammonia selectivity against λ.

The results for the following examples are given as the percentage conversion of CO, $H_2$, $NO_x$, $CH_4$, $C_3H_8$ and $C_3H_6$ against λ and ammonia selectivity against λ.

EXAMPLE 4

Figure 8:
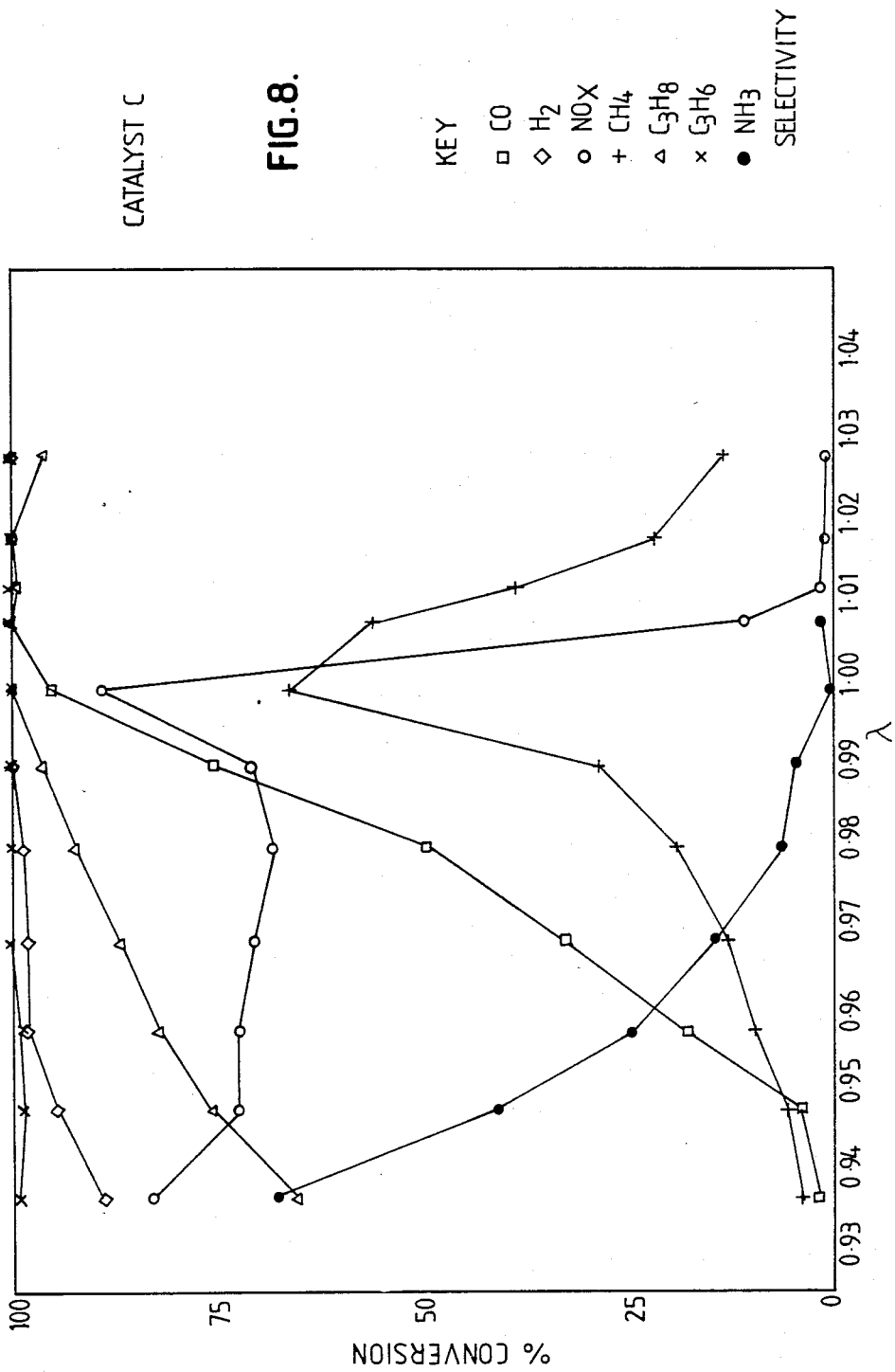
Figure 9:
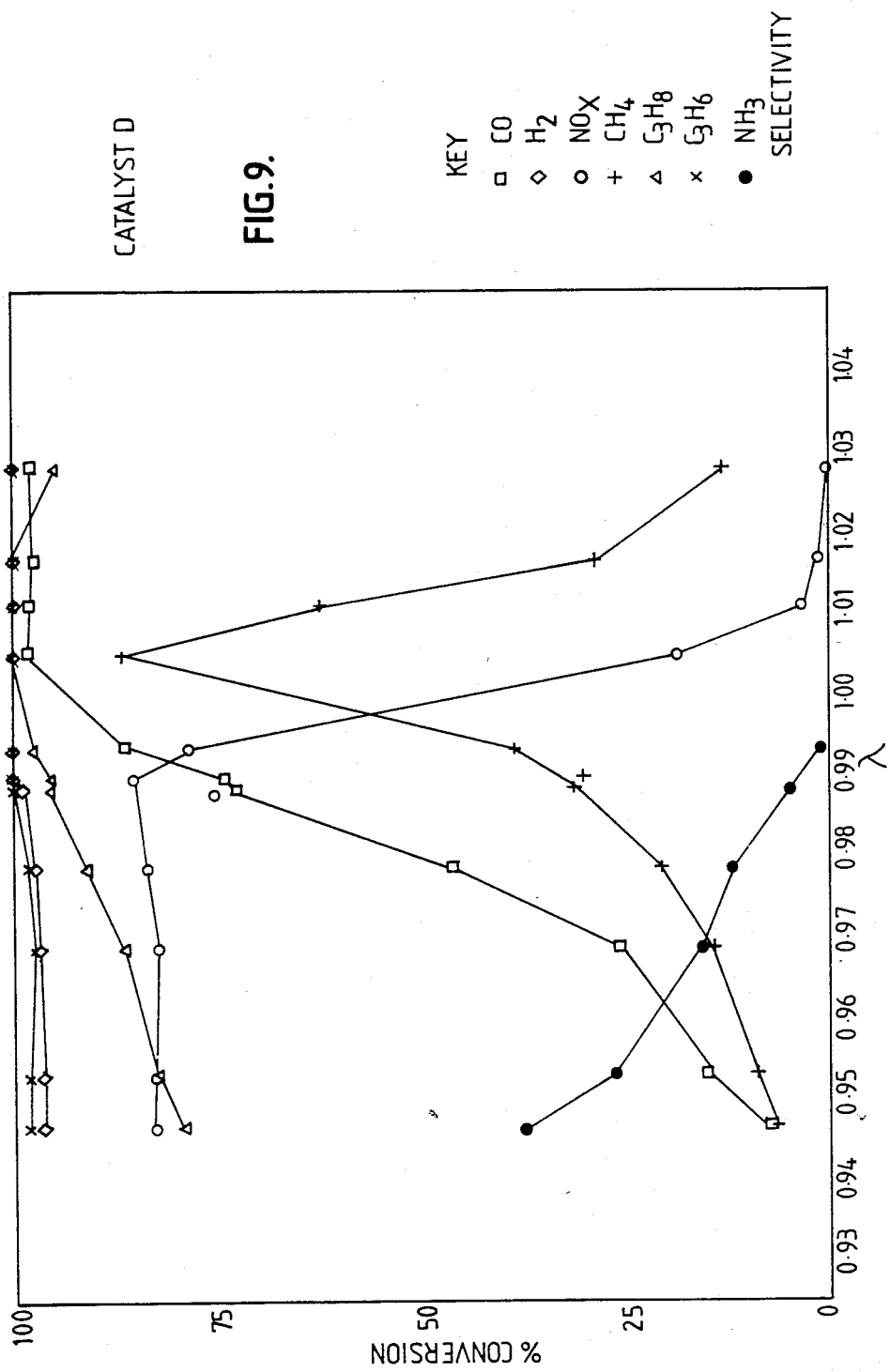
Figure 10:
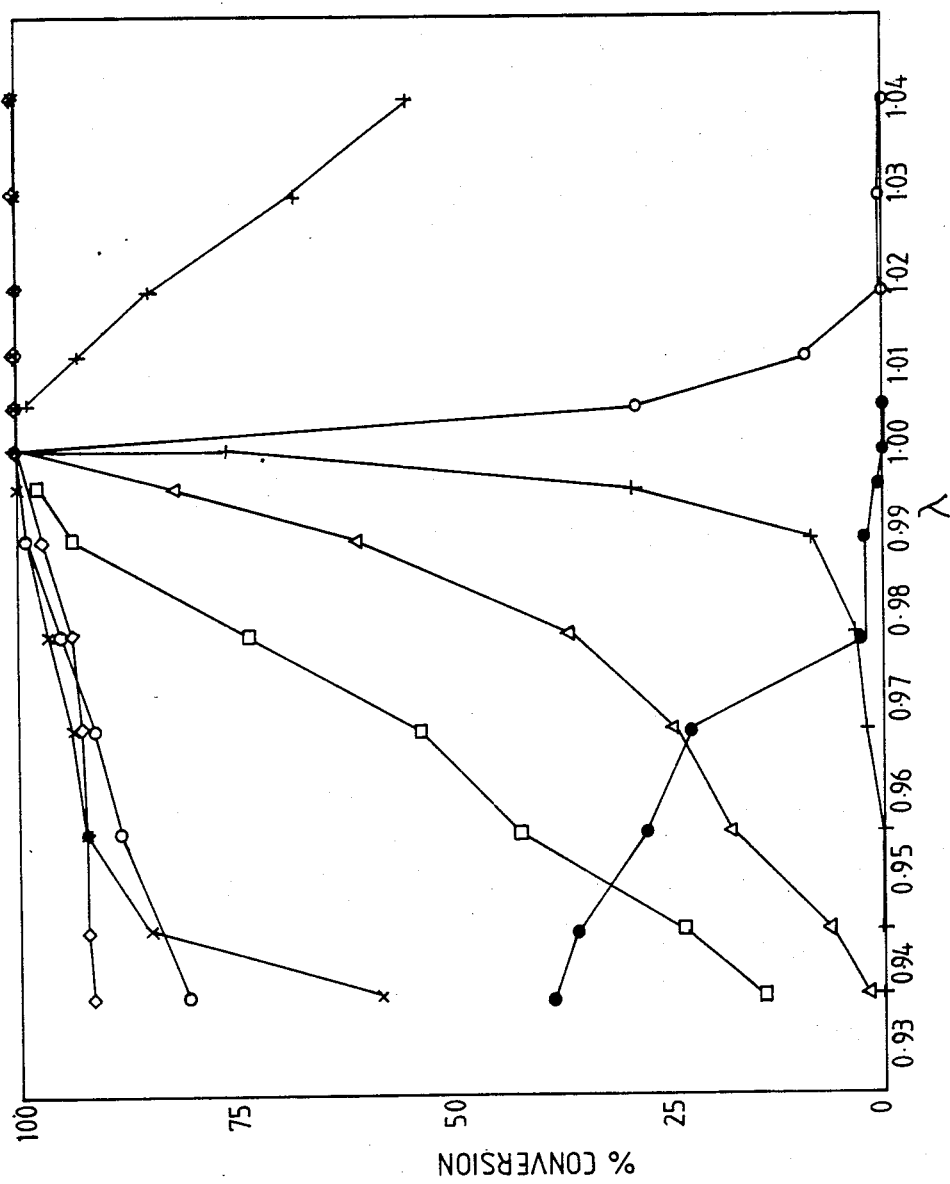
Figure 11:
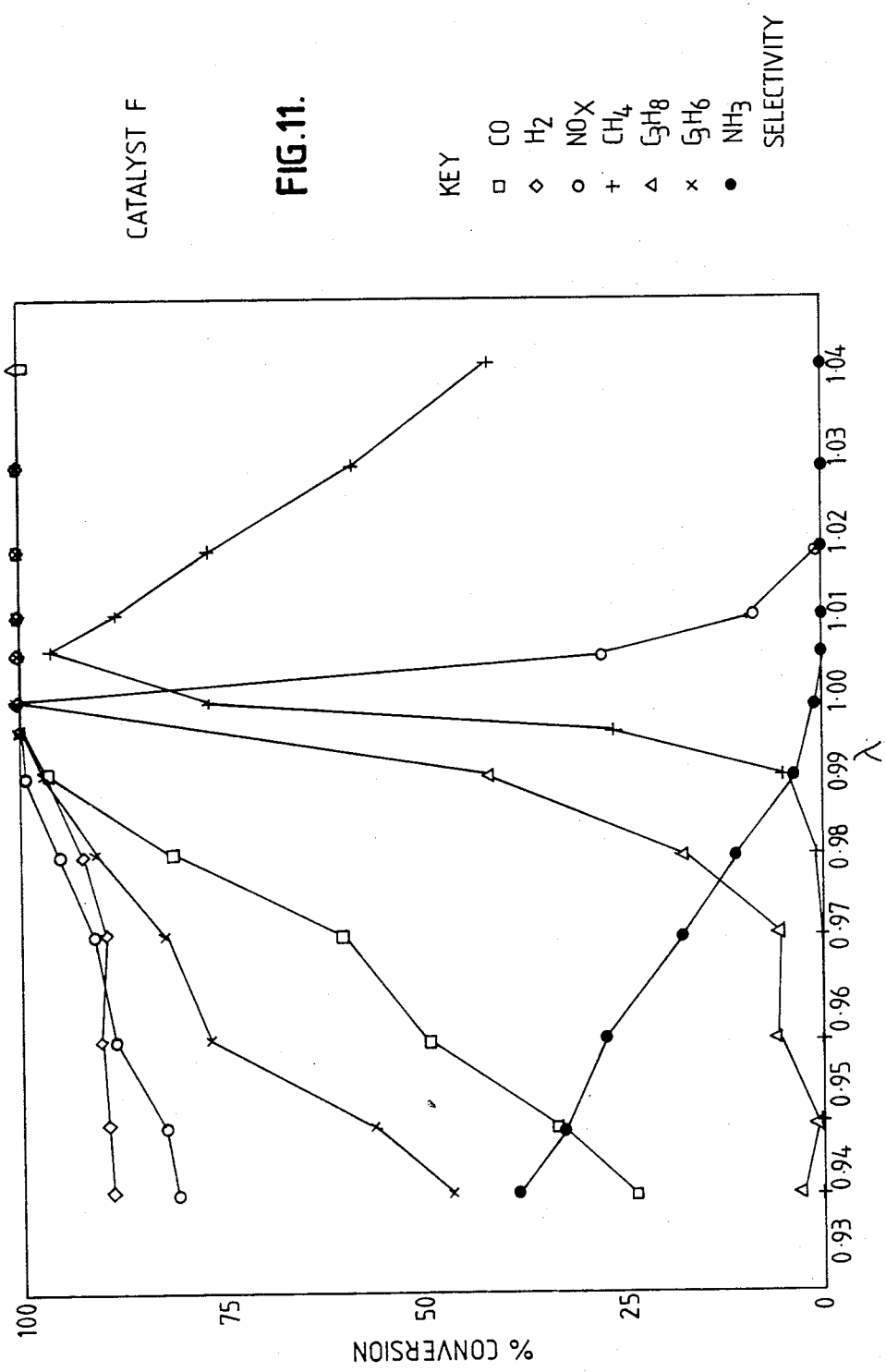
Figure 12:
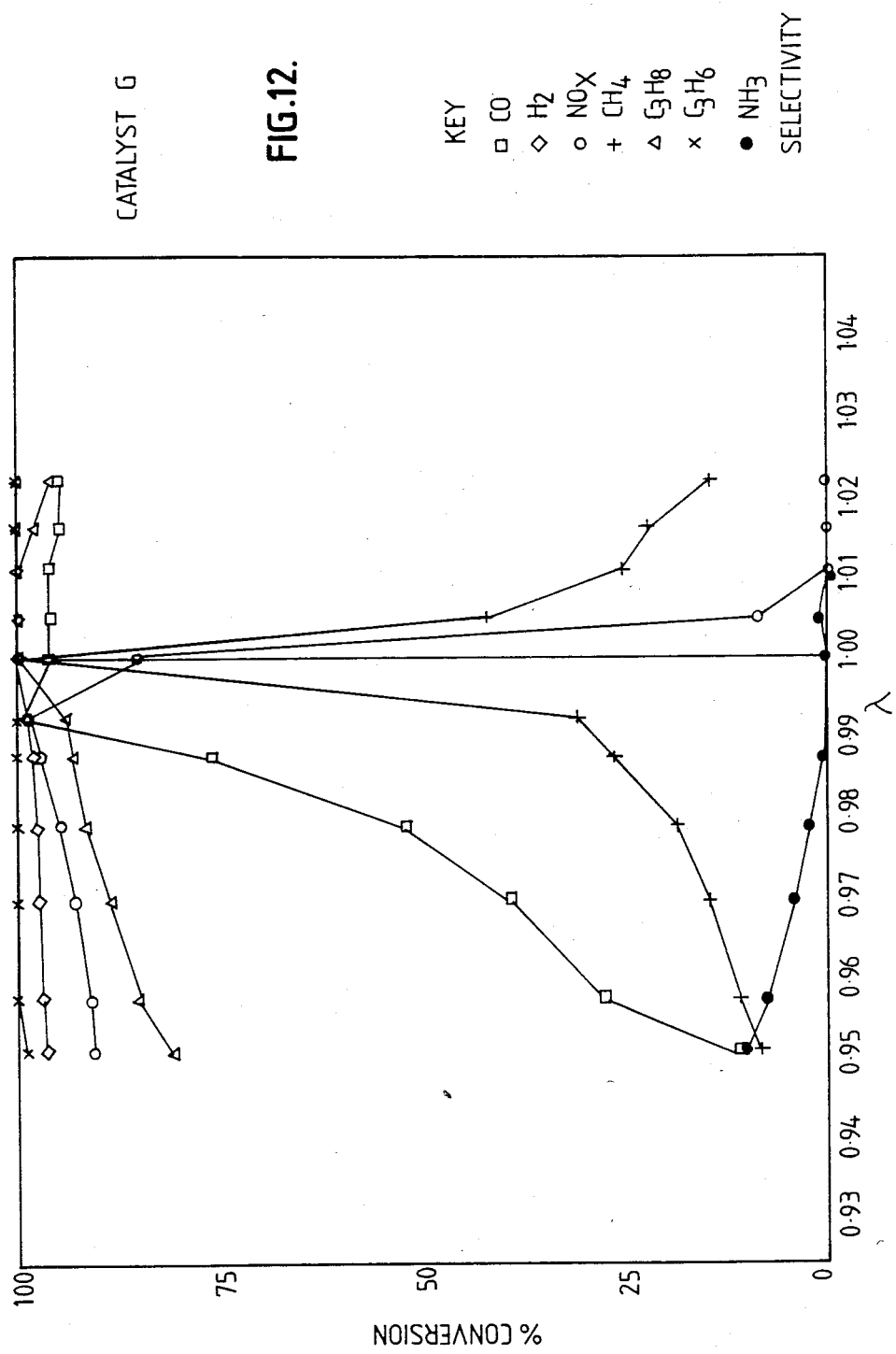
Figure 13:
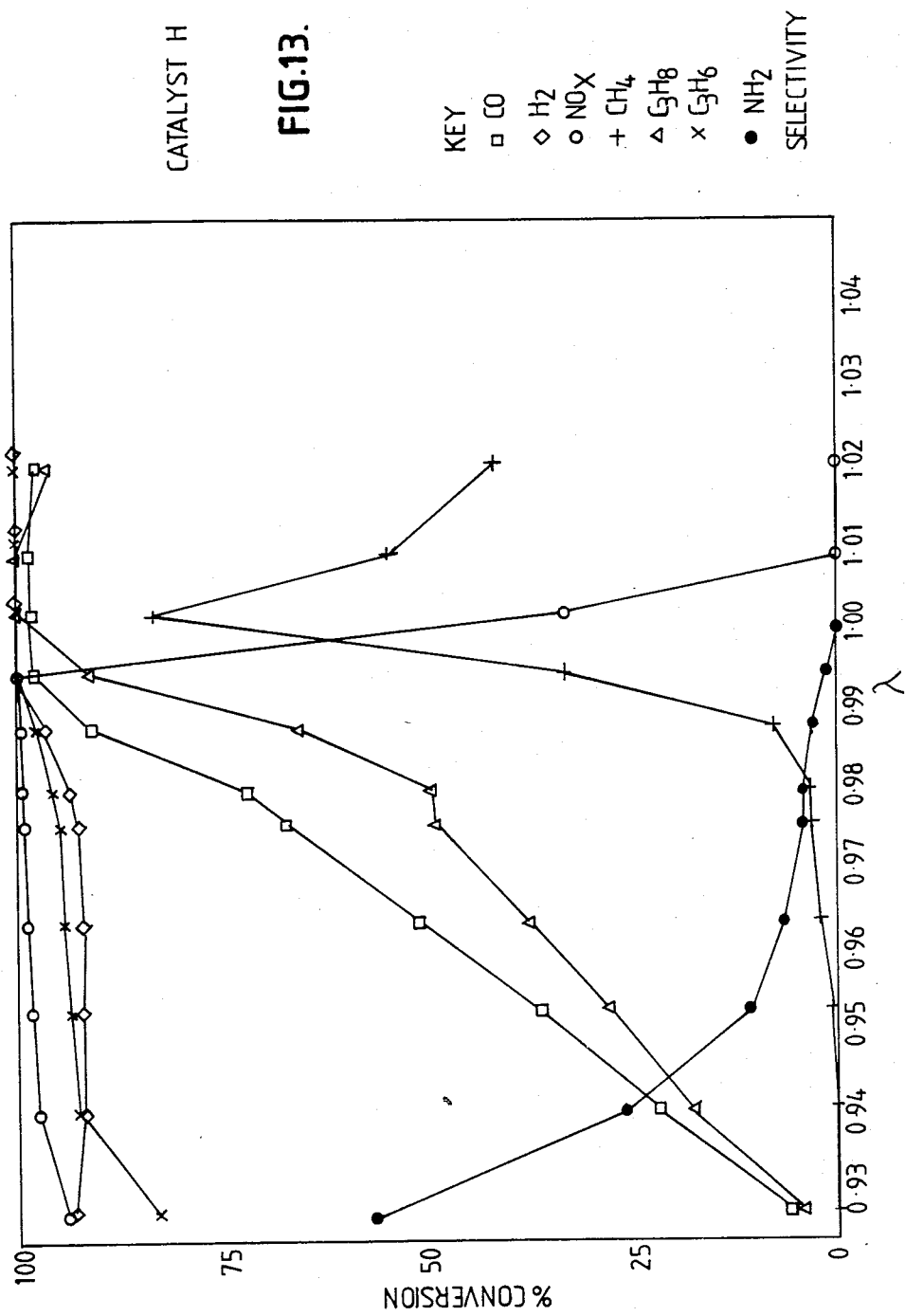
Figure 14:
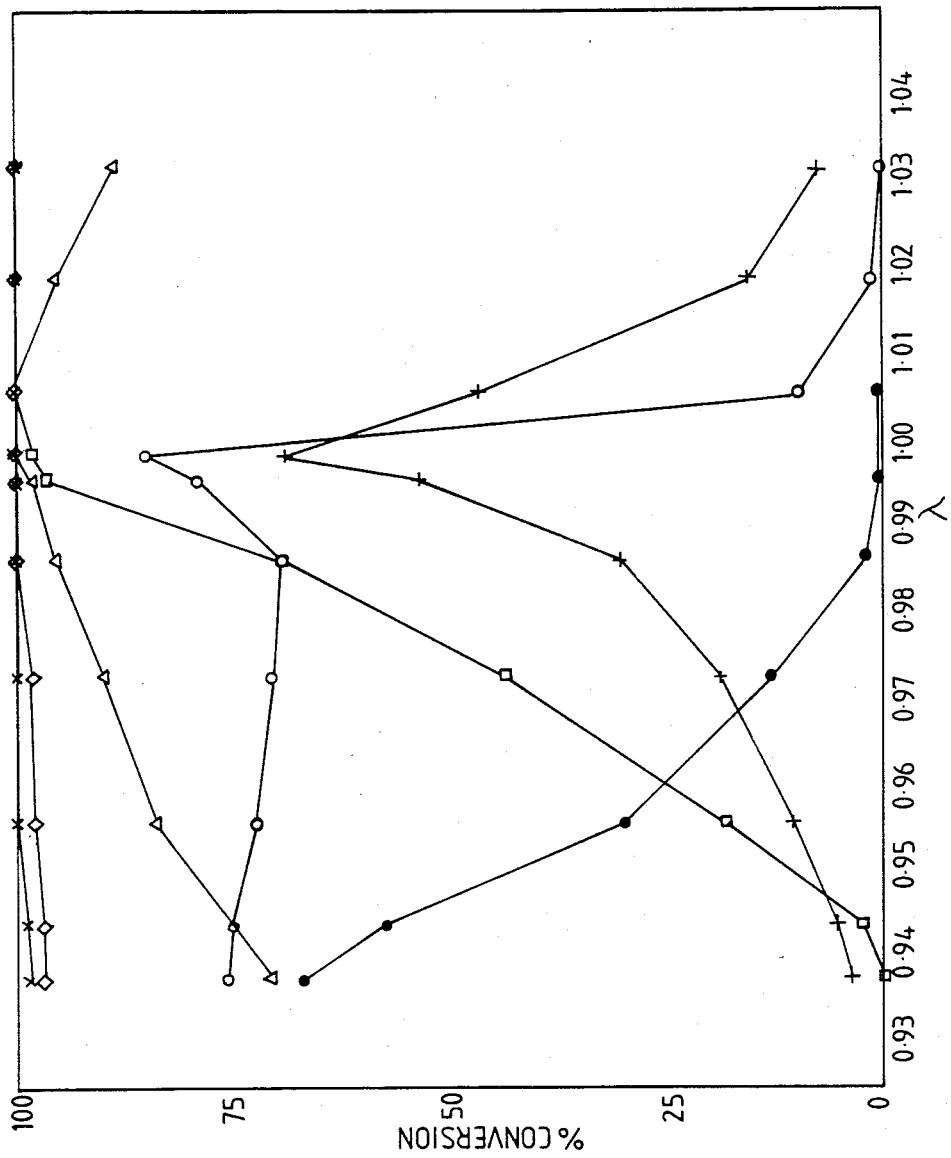
Figure 15:
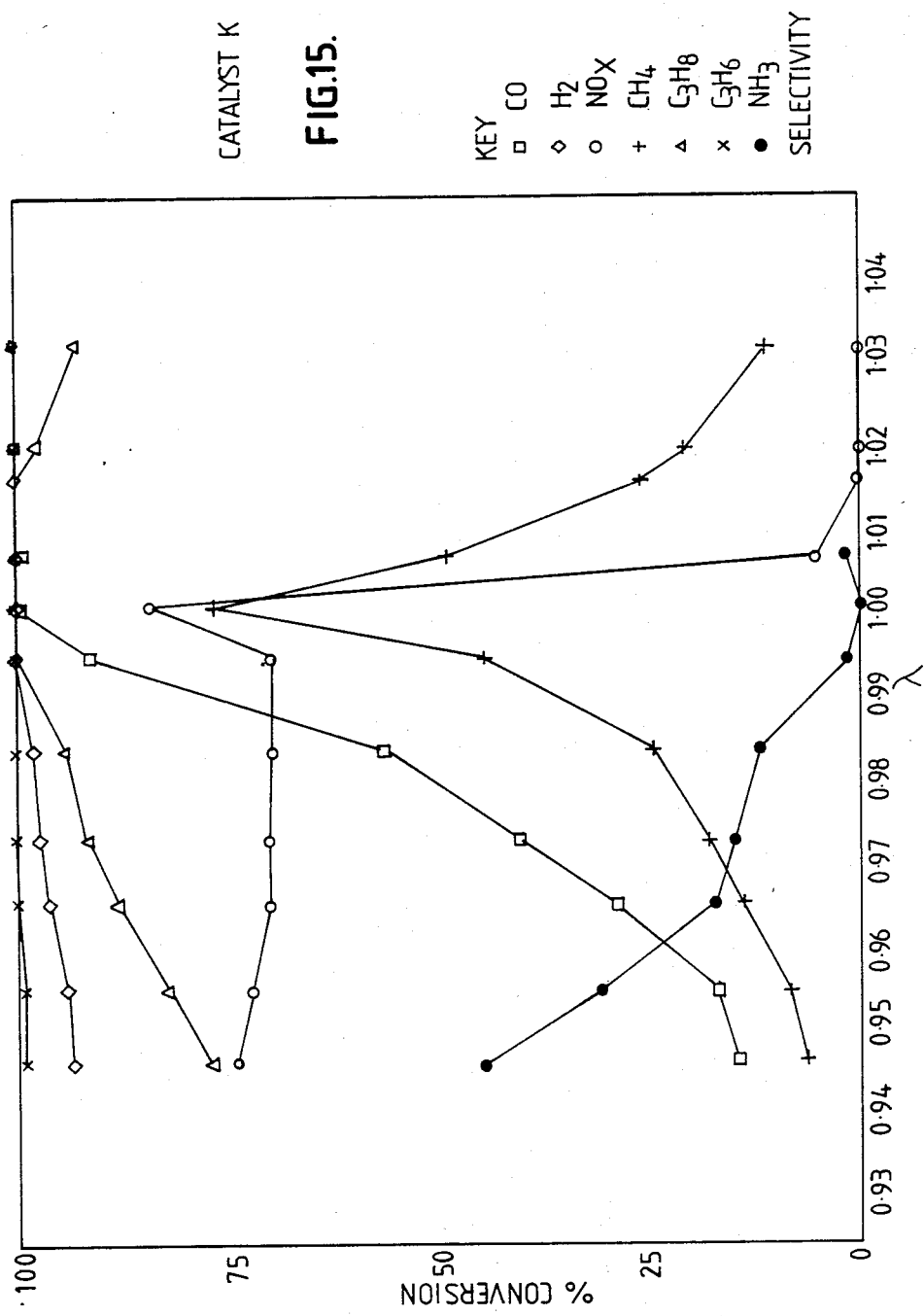
Figure 16:
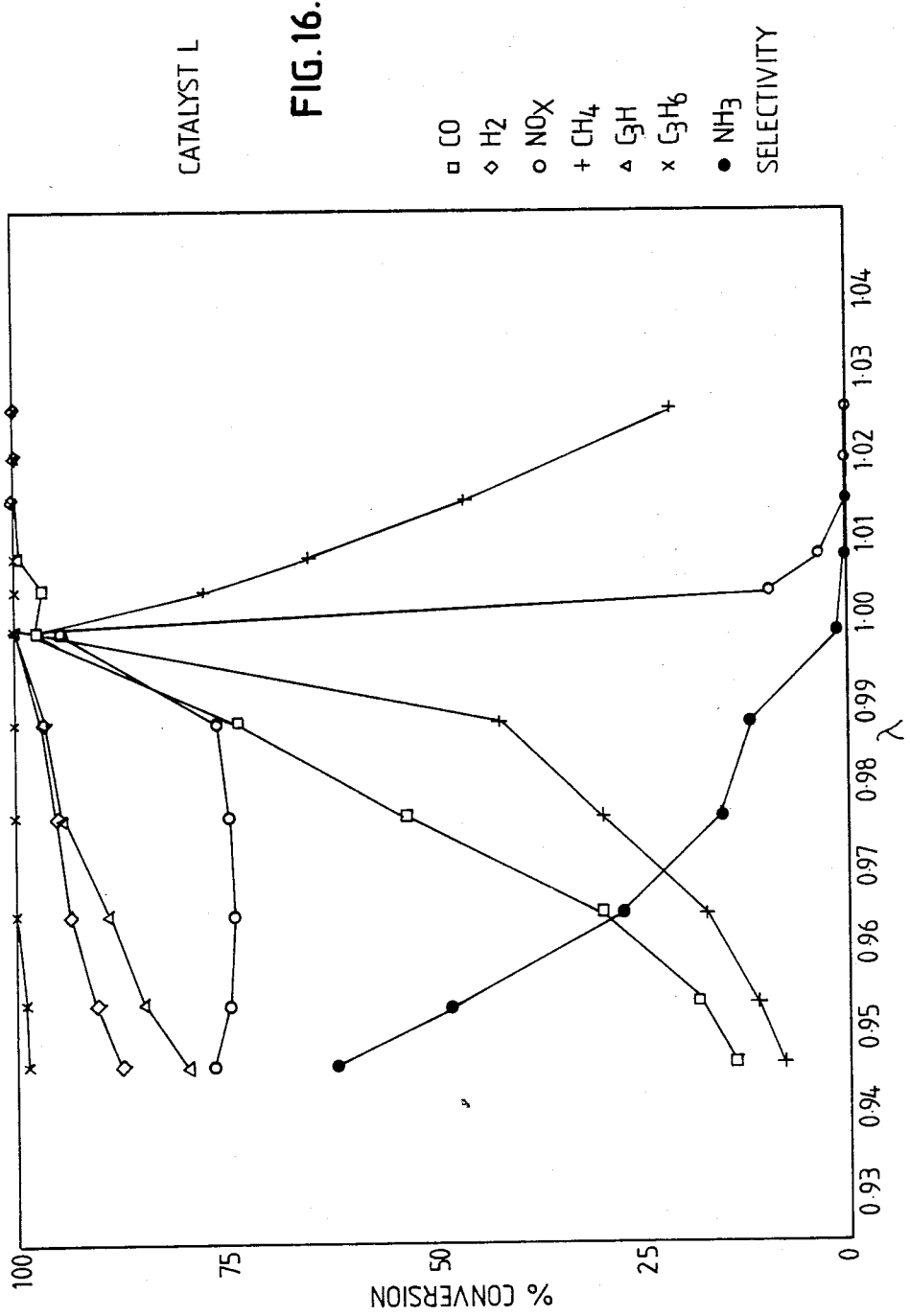

Catalysts C and D were prepared containing palladium as the platinum group metal and tungsten. The loading of the palladium was 883 g per m³ for catalysts C and 1766 g per m³ for catalyst D. The results of the tests of these catalysts are given in FIGS. 8 and 9.

EXAMPLE 5

A number of catalysts were prepared containing two platinum group metals. Catalysts E, G, J, K, L and M contained tungsten and catalysts F and H did not. The total loading of the two platinum group metals (PGMs) was 883 g per m³. The composition of the catalysts prepared are given in Table 2 below.

TABLE 2

| Catalyst | PGMs | Ratio of PGMs | W present | FIG. |
|---|---|---|---|---|
| E | Pt + Rh | Pt:Rh = 13:1 | Yes | 10 |
| F | Pt + Rh | Pt:Rh = 13:1 | No | 11 |
| G | Pd + Rh | Pd:Rh = 40:1 | Yes | 12 |
| H | Pd + Rh | Pd:Rh = 40:1 | No | 13 |
| J | Pd + Pt | Pd:Pt = 12:1 | Yes | 14 |
| K | Pd + Pt | Pd:Pt = 5:1 | Yes | 15 |
| L | Pd + Pt | Pd:Pt = 2:1 | Yes | 16 |
| M | Pd + Pt | Pd:Pt = 1:2 | Yes | 17 |

A comparison of the results for catalysts 2–5 with those for catalyst 1 show that when tungsten is added to a three-way catalyst containing platinum and rhodium, the ammonia formation is reduced. FIGS. 3 and 4 illustrate the effect of different loadings of tungsten on the formation of ammonia and ammonia selectivity.

The addition of tungsten to a three-way catalyst containing palladium improves the performance of the catalyst by reducing the amount of ammonia formed. The effect of increasing the palladium loading from 883 g per m³ to 1766 g per m³ is slight.

The comparison of results for catalysts E and F and G and H shows the improvement in performance of a three-way catalyst containing two platinum group metals when tungsten is added. For a Pt/Rh catalyst (catalyst E) the addition of tungsten improves the oxidation of $C_3H_8$ and $C_3H_6$ for $\lambda$'s less than 1 and of $CH_4$ for $\lambda$'s greater than 1. The formation of ammonia is reduced. A Pd/Rh catalyst (catalyst G) with tungsten has greatly improved conversion of $C_3H_8$ at $\lambda$'s less than 1 and of $CH_4$ at $\lambda$'s greater than 1.

The results for catalysts E–H show that a three-way catalyst containing two platinum group metals and tungsten or a tunsten containing compound has improved oxidation of hydrocarbons and reduced ammonia formation.

We claim:

1. A three-way catalyst suitable for the purification of exhaust gas from an internal combustion engine in a motor vehicle, the catalyst comprising:
   a. a monolithic substrate through which exhaust gas may flow,
   b. a refractory oxide layer deposited on the substrate,
   c. at least one platinum group metal component selected from the group consisting of platinum, rhodium and palladium, and
   d. a tungsten component selected from the group consisting of tungsten metal and a tungsten-containing compound the amount of platinum group metal present being from 300 to 3500 g per $m^3$ of the volume of the monolithic substrate with the refractory oxide layer deposited thereon, the amount of tungsten present being at least from 2650 to 22,000 g per $m^3$ of said volume of substrate and deposited oxide layer, and the weight ratio of tungsten to platinum group metal being from 2.3 to 18.8:1, the catalyst being further characterized by its ability to oxidize carbon monoxide and hydrocarbon, and to reduce nitrogen oxides with a reduced tendency to form ammonia.

2. A three-way catalyst according to claim 1 wherein the substrate is a monolithic structure fabricated from a ceramic or metallic material.

3. A three-way catalyst according to claim 1 wherein the refractory oxide layer comprises one or more of the oxides of B, Al, Ba, Sr, Ca, Mg, Be, Si, Ti, Ni, Zr, Sc, Y and the lanthanide metals.

4. A three-way catalyst according to claim 3 wherein the loading of the refractory oxide layer is between 0.03 and 0.6 g per $cm^3$ of the substrate.

5. A three-way catalyst according to claim 3 wherein the loading of the refractory oxide layer is between 0.1 and 0.125 g per $cm^3$ of the substrate.

6. A three-way catalyst according to claim 1 wherein the platinum group metal component is present at a loading of between 600 and 1800 g per $m^3$ of the combination of monolithic substrate and refractory oxide layer deposited thereon.

7. A three-way catalyst according to claim 1 wherein the tungsten is present as at least one compound of tungsten containing oxygen and at a loading of between 3500 and 14000 g per $m^3$.

8. A three-way catalyst according to claim 1 wherein the tungsten is present as at least one compound of tungsten containing oxygen and at a loading of between 5000 and 11,000 g per $m^3$.

9. A three-way catalyst according to claim 1 containing two or more platinum group metals.

10. A method for the preparation of a three-way catalyst comprising:
    (a) depositing a refractory oxide layer on a monolithic substrate;
    (b) depositing on the refractory oxide layer a catalyst component which comprises at least one platinum group metal selected from the group consisting of platinum, rhodium and palladium and wherein the amount of platinum group metal deposited is from 300 to 3500 g per $m^3$ of the volume of the monolithic with the refractory layer deposited thereon;
    (c) before or after deposition, associating a tungsten-containing compound with the said refractory oxide and/or the said one or more platinum group metals wherein the amount of tungsten moiety associated is from 2650 to 22,000 g per $m^3$ of the volume of the monolith substrate with the refractory layer deposited thereon and the weight ratio of tungsten to platinum group metal is from 2.3 to 18.8:1.

* * * * *